Aug. 9, 1927.  
J. B. FISHER  
1,638,251  
WASHER  
Filed March 30, 1925
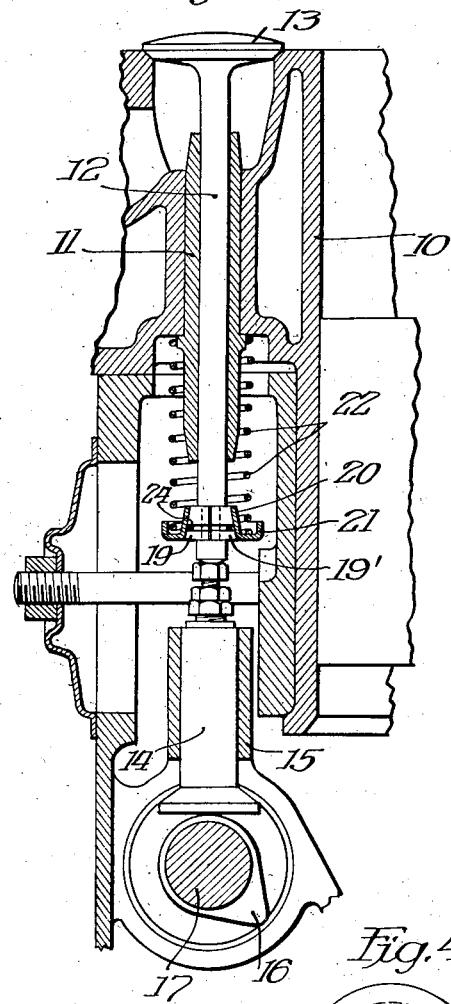
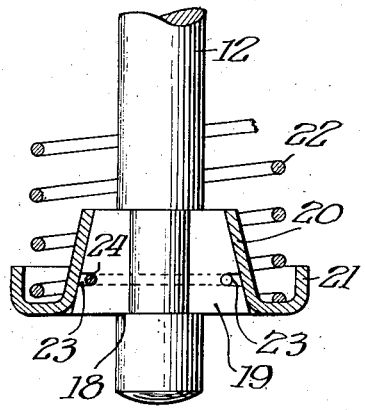
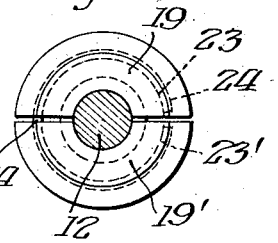
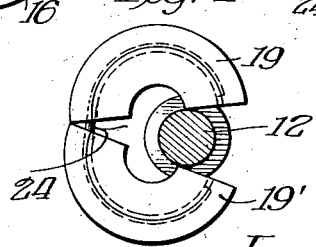
Inventor:
James B. Fisher.
by Brown, Boettcher + Dronney
Attys.

Patented Aug. 9, 1927.

1,638,251

UNITED STATES PATENT OFFICE.

JAMES B. FISHER, OF WAUKESHA, WISCONSIN, ASSIGNOR TO WAUKESHA MOTOR COMPANY, OF WAUKESHA, WISCONSIN, A CORPORATION OF WISCONSIN.

WASHER.

Application filed March 30, 1925. Serial No. 19,306.

My invention relates to washers or collar structures, particularly adaptable in explosive engines for detachably supporting on the valve spindle the abutment cup for the compression spring which holds the valve to its seat. Such washers are usually of two halves which fit into a groove in the valve stem and are received and held in place by the spring cup frame. The spring and cup frame are frequently withdrawn in order that the valve may be removed, and the washer parts, when released from the cup, may fall down into the engine frame and cause considerable annoyance. The object of my invention is, therefore, to provide simple construction and means which will detachably hold the washer or collar halves to the valve spindle, so that they cannot drop therefrom unless positively removed. My improved construction is clearly shown in the accompanying drawings, in which:

Figure 1 is a sectional view of part of an engine, showing the valve and its operating mechanism;

Fig. 2 is an enlarged side elevational view of the lower end of the valve spindle with the spring cup frames in diametral section;

Fig. 3 is a plan view of the washer or collar structure secured on the spindle; and Fig. 4 is a similar view showing the manner of removing or applying the washer structure.

On the drawings, 10 represents the engine frame having the valve guide way 11 for the stem 12 of the valve head 13. Below the stem 12 the tappet 14 reciprocates in the bearing 15 under control of the cam 16 on the cam shaft 17 to raise and lower the valve for the proper operation of the engine. At its lower end the valve stem has the annular groove 18 in which seat the halves 19 and 19' of a washer or collar structure, the outer sides of which are conical to be engaged and held together by the conical spring supporting frame 20 having the curved trough or flange 21 in which seats the compression spring 22 which abuts at its upper end against the engine frame.

The washer halves are securely held together when the conical frame is held in engagement therewith by the spring, but when the spring is removed and the frame raised, the washer halves may readily slip through the fingers and then drop to the bottom of the engine frame and cause considerable annoyance and waste of time. To eliminate this, I provide circumferential registering grooves 23 and 23' in the washer halves and in these grooves I apply a length of wire 24 of readily flexible but inelastic material. Such wire or hoop 24 will hold the washer halves together on the spindle preparatory to applying the spring seating frame, or after such frame has been removed, and there is, therefore, no danger of the washer parts dropping down. The hoop or wire can be made of soft metal, such as iron, or copper, and then when the washer halves are opened up, as shown in Fig. 4, the belt will still hold the halves to each other when they are moved apart to be withdrawn from the spindle or to be re-applied thereto. To re-apply them the halves are merely pinched together and the hoop will then hold them closed. I have found that with this simple arrangement the washer structure will always remain in place on the spindle during the application or removal of the spring frame and all danger of the washer parts falling down into the engine frame has been eliminated.

I claim:

1. A washer structure comprising halves having registering grooves, and a tie member engaging in said grooves to surround said halves, said tie member being of readily flexible but inelastic metal for holding said halves together or for permitting relative swing of said halves.

2. In combination, a valve stem having a peripheral groove, a washer structure composed of two halves for engaging in said groove, said halves having registering peripheral grooves, and a split hoop engaging in said grooves, said hoop being of readily flexible but inelastic metal to be readily positioned to hold said halves together in said stem groove or to permit separation of said halves and removal thereof from the stem.

In witness whereof, I hereunto subscribe my name this 27 day of March, 1925.

JAMES B. FISHER.